United States Patent [19]
Arnett

[11] Patent Number: 5,909,472
[45] Date of Patent: *Jun. 1, 1999

[54] DIGITAL CIRCUIT CLOCKING USING A DUAL SIDE BAND SUPPRESSED CARRIER CLOCK MODULATED SIGNAL

[75] Inventor: David W. Arnett, Corvallis, Oreg.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/741,489

[22] Filed: Oct. 30, 1996

Related U.S. Application Data

[63] Continuation-in-part of application No. 08/695,093, Aug. 8, 1996.

[51] Int. Cl.$^6$ ................................ H04L 7/00; H03C 1/52
[52] U.S. Cl. .......................... 375/362; 375/270; 327/162; 332/167
[58] Field of Search ..................... 375/354, 270, 375/277, 356, 357, 362, 364, 377, 200, 301, 321, 206; 327/162, 105, 107; 332/167, 168, 158; 329/356; 455/46, 109, 202; 364/724.011, 724.012, 724.06, 724.08, 724.16, 724.19; 331/47

[56] References Cited

U.S. PATENT DOCUMENTS 3,354,410  11/1967  Beuscher .................................. 331/78
3,916,410  10/1975  Elwood .................................. 342/458

OTHER PUBLICATIONS

Hardin et al., "Spread Spectrum Clock Generation for the Reduction of Radiated Emissions," IEEE Doc. # 0–7803–1298; Apr. 1994.

*Primary Examiner*—Chi H. Pham
*Assistant Examiner*—William Luther

[57] ABSTRACT

In a computer or other digital system a double side band suppressed carrier (DSB-SC) signal is derived from a clock or other synchronous signal. The clock or other synchronous signal is amplitude modulated at a source using a broadband low frequency envelope signal. The modulated signal is the DSB-SC signal, which then serves as a clock or other synchronous signal for the source and/or a destination circuit.

6 Claims, 3 Drawing Sheets

DIGITAL CIRCUIT CLOCKING USING A DUAL SIDE BAND SUPPRESSED CARRIER CLOCK MODULATED SIGNAL

CROSS REFERENCED TO RELATED APPLICATIONS

This application is a continuation-in-part of commonly assigned co-pending application "Clock Distribution via Suppressed Carrier To Reduce EMI", Ser. No. 08/695,093, filed on Aug. 8, 1996.

BACKGROUND OF THE INVENTION

This invention relates generally to methods and apparatus for reducing electromagnetic interference ('EMI') emissions from a digital system, and more particularly for reducing EMI emissions from clock and other synchronous signal traces for a computer or other digitally-clocked system.

Electromagnetic interference is electromagnetic energy emitted from electronic devices which, either directly or indirectly, contributes to a degradation in performance of an electronic receiver or other electronic system. EMI radiation from poorly shielded electronic devices, for example, degrade radio and television signals resulting in audible or visible static at receivers picking up such signals. Governments typically regulate EMI emissions to enhance public use of the radio wave spectrum and other electromagnetic wave spectra. In the United States, for example, the F.C.C. requires testing of devices and rates the devices by class according to their emissions. The United States F.C.C. Agency rates EMI emissions over a 120 kilohertz ("kHz") bandwidth. The 120 kHz bandwidth corresponds to the typical bandwidth of a conventional communication receiver, such as an FM receiver. Reduced EMI emissions within such bandwidth reduce the interference output, otherwise perceived by a listener or viewer as, for example, static or white noise.

Typical precautions taken by electronic manufacturers are to provide shielding of electronic devices to minimize EMI emissions. Computer manufacturers, for example, typically use shielded cables and shielded housings to minimize EMI emissions.

This invention is directed toward a digital method and apparatus for reducing detectable EMI emissions within a critical bandwidth (e.g., 120 kHz).

SUMMARY OF THE INVENTION

According to the invention, a clock or other synchronous signal is amplitude modulated at a source. The modulated signal is a dual side band suppressed carrier (DSB-SC) signal which is routed to a destination, where the DSB-SC signal acts as a clock for a digital circuit. The modulation spreads the clock signal energy over a widened spectrum so as to reduce EMI emissions over a bandwidth of interest (e.g., 120 kHz).

According to one aspect of this invention, the carrier signal in the amplitude modulation process is a square wave clock or other synchronous signal. For a computer system such signal typically has a high frequency of 1 megahertz ("MHz") or greater. The envelope signal for the amplitude modulation process is a low frequency broadband signal. Preferably, the envelope signal is a broadband rectangular wave signal varying in frequency. The primary frequency components (i.e., the fundamental frequencies) of the broadband signal preferably occur within a range up to one-half the frequency of the clock or other synchronous signal. Primary frequencies up to the clock signal frequency also may be used.

According to another aspect of the invention, the modulated DSB-SC signal is routed from a source to a destination circuit.

According to preferred embodiments, a method and apparatus for reducing EMI emissions attributable to synchronous signals in a digital system is provided, (e.g., EMI emitted directly from signal paths carrying such synchronous signals or from other signal paths coupled to such signal paths). The digital system includes a source circuit generating a first synchronous signal. The first synchronous signal occurs at the source circuit and has a first signal frequency spectrum, including a first frequency and harmonics of the first frequency. A first envelope signal is present and has a first envelope frequency spectrum including frequencies not greater than the first frequency. The first envelope signal defines a first bandwidth. A modulation circuit within the source circuit receives the first synchronous signal and the first envelope signal. The first synchronous signal is amplitude modulated with the envelope signal to generate a dual side band suppressed carrier signal. A first signal path routes the dual side band suppressed carrier signal from the source integrated circuit chip to the destination integrated circuit chip. Detectable EMI emissions attributable to the first synchronous signal are reduced by not routing the first synchronous signal from the source integrated circuit to the destination integrated circuit, and instead routing the dual side band suppressed carrier signal. The dual side band suppressed carrier signal has energy spread over the first bandwidth at each side band. The first bandwidth is wide enough to reduce detectable EMI emissions.

Preferably the lower edge of the DSB-SC signal left side band to the upper edge of the DSB-SC signal right side band spans at least 120 kHz. For adjoining side bands this is achieved using an envelope signal having a spectrum spanning from 0 to at least 60 kHz. For non-adjoining side bands this is achieved by using an envelope signal (i) having a spectrum commencing at more than 60 kHz; (ii) having a bandwidth greater than 60 kHz; or (iii) satisfying the following relationship: $2*f_4+2BW_{45}>120$ kHz, where $f_4$ is the lowest frequency of the envelope signal spectrum and $BW_{45}$ is the envelope signal bandwidth. The envelope frequency spectrum upper frequency bound preferably is less than or equal to one-half the first frequency, although the upper bound alternatively may be as high as the first frequency.

By modulating the clock signal with a lower frequency envelope signal, some clock pulses are spaced farther apart. Specifically, an active clock pulse edge for the modulated signal comes after a longer period than for the original clock signal. For systems sensitive to jitter, using the modulated signal as the clock signal introduces phase jitter which may cause circuitry state errors to occur. However, for circuits directly driven having a minimum delay requirement, but no maximum delay requirement, such modulation does not introduce state errors. Logic circuits such as state machines typically do not have a maximum delay requirement. Accordingly, the modulated clock signal of this invention is particularly useful for such circuit applications.

An advantage of the invention is that the signals routed from source to destination along the PC board traces have their energy spread across side bands of the modulated signal. The result is a reduction in EMI emissions from the PC board traces. EMI emissions attributable to the PC board traces also are reduced. For example, systems, circuits or traces having a signal path experiencing electromagnetically coupling to a PC board trace will have reduced EMI attributable to the synchronous signals flowing through the PC board trace. These and other aspects and advantages of the invention will be better understood by reference to the following detailed description taken in conjunction with the accompanying drawings.

DESCRIPTION OF SPECIFIC EMBODIMENTS

Figure 1:
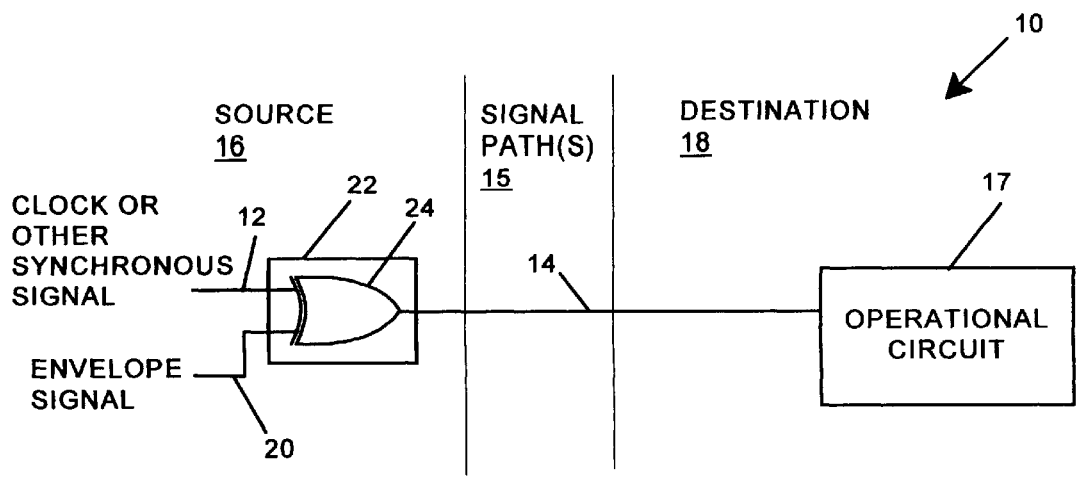
FIG. 1 is a block diagram of an apparatus for distributing a clock signal via suppressed carrier according to an embodiment of this invention.
Figure 2:
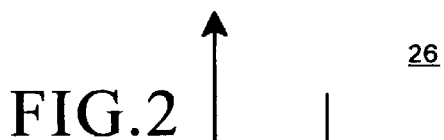
FIG. 2 is a chart of a frequency spectrum for an embodiment of the clock or other synchronous signal of FIG. 1.

FIG. 1 shows an apparatus 10 for generating a dual side band-suppressed carrier (DSB-SC) signal 14 derived from a clock or other synchronous signal 12, according to an embodiment of this invention. In one embodiment a modulated signal 14 is routed from a source circuit 16 to an operational circuit 17 of a destination circuit 18. The apparatus 10 is part of a computer or other digital system in which PC board traces and/or other off-chip or off-board conductive signal paths 15 electrically couple a source 16 and a destination 18. The PC board traces, for example, are formed as strips of metal or other conductive material. When a signal is routed over traces radiation is emitted from the strips into the surrounding environment, as like an antenna. Electromagnetic energy also may be coupled to neighboring traces and propagated into other circuits and systems where EMI occurs. The radiation energy is determined in part by the energy and frequency of the routed signal. For a conventional computer routed signals typically include the clock and other synchronous signals 12. Typically the clock or other synchronous signal 12 has a high frequency. Energy is radiated at such frequency (i.e., the primary or fundamental frequency) and at harmonics of such frequency. Such energy also is referred to as electromagnetic interference because it causes interference with other electromagnetic waves in the environment. Of particular concern are signals within the radio and television frequency spectrum. Interference with radio and television signals is perceived as static or white noise. Accordingly, EMI emissions occurring within the 120 kHz bandwidth of conventional electronic radio and television receivers is undesirable. Thus, it is an object of the invention to spread the energy of the clock signal an other synchronous signals 12 over a frequency band in excess of the 120 kHz bandwidth or another EMI-critical frequency bandwidth of interest. FIG. 2 shows an exemplary frequency spectrum 26 for a clock signal 12. The spectrum 26 includes a primary frequency $f_1$ (i.e., the clock signal frequency) and multiple harmonics $f_2$, $f_3$ of the primary frequency.

Figure 3:
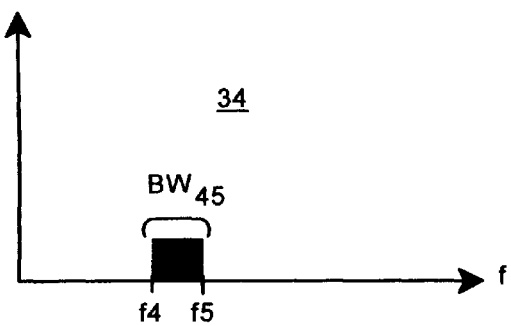
FIG. 3 is a chart of a frequency spectrum for an embodiment of the envelope signal of FIG. 1.

To spread the energy of the clock signal 12 over a broad spectrum, the clock signal 12 is amplitude modulated with an envelope signal 20. The envelope signal 20 is a broadband signal having a frequency spectrum including primary frequencies not higher than the clock signal primary frequency, $f_1$. Preferably, the envelope signal primary frequencies do not exceed one-half the clock signal primary frequency. FIG. 3 shows an exemplary frequency spectrum 34 for a broad band, rectilinear-wave, envelope signal 20. The envelope signal frequency spectrum 34 spans from a first frequency $f_4$ to a second frequency $f_5$ to define a bandwidth $BW_{45}$.

Figure 4:
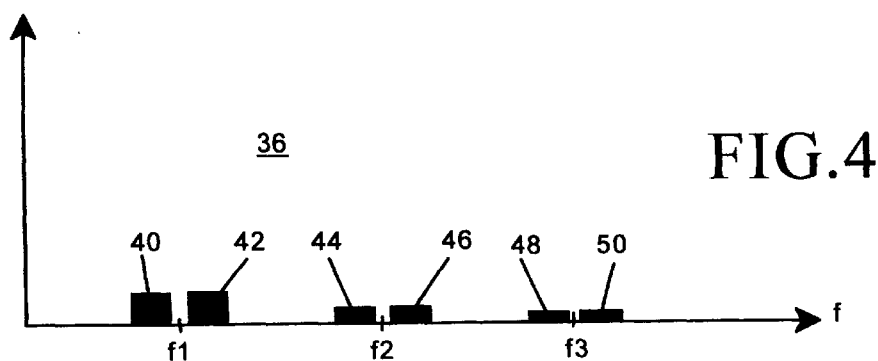
FIG. 4 is a chart of the modulated signal of FIG. 1 according to an embodiment of this invention.

A modulation circuit 22 is used to amplitude modulate the clock signal or other synchronous signal 12 with the envelope signal 20. In one embodiment the modulation circuit 22 includes an exclusive 'OR' gate 24. The modulated signal 14 output from the modulation circuit 22 is a dual side band suppressed carrier signal. FIG. 4 shows an exemplary frequency spectrum 36 of a modulated signal 14 derived from the clock signal 12 of FIG. 2 and the envelope signal 20 of FIG. 3. Note that by using amplitude modulation, the modulated signal 14 is a dual side band suppressed carrier signal. Comparing FIGS. 2 and 4 it is seen that the energy of the primary frequency $f_1$ is spread over two side bands 40, 42. Similarly the energy of the first harmonic $f_2$ is spread over two side bands 44, 46 and the energy of other harmonics (e.g. $f_3$) are spread over respective dual side bands (e.g., 48, 50). Note that each side band 40–50 has a bandwidth equal to the bandwidth $BW_{45}$ of the envelope signal 20 (See FIG. 3). Thus, by using a wide bandwidth envelope frequency spectrum the clock signal energy is spread beyond the 120 kHZ bandwidth of interest (or another EMI critical bandwidth of interest).

To achieve spreading of more than 120 kHz, the primary frequencies defining the envelope signal frequency spectrum conform to the following equation (I):

$$2*f_4 + 2BW_{45} > F_{critical} \quad (I)$$

where, $f_4$ is the lowest frequency of the envelope signal spectrum;

$BW_{45}$ is the envelope signal bandwidth; and $F_{critical}$=120 kHz or another EMI critical frequency of interest.

Equation (I) is equivalent to the following equation (II):

$$f_5 > (F_{critical}/2) \quad (II)$$

where $f_5$ is the highest frequency of the envelope signal spectrum;

For $F_{critical}$=120 kHz the lower frequency of the DSB-SC signal left side band 40 to the upper frequency of the DSB-SC signal right side band 42 spans at least 120 kHz. For adjoining side bands 40, 42 forming one continuous band centered at $f_1$ this is achieved using an envelope signal having a spectrum 34 spanning from $f_4$=0 to $f_5$>60 kHz. For non-adjoining side bands one solution is to use an envelope signal having a spectrum commencing at $f_4$>60 kHz. Another solution is to have the bandwidth $BW_{45}$>60 kHz. Another solution is to have $f_5$>60 kHz. In other embodiments other solutions to equation (I) are used. Preferably, the envelope frequency spectrum 34 upper frequency bound $f_5$ is less than the first frequency. The envelope frequency spectrum 34 for best mode embodiments includes frequencies less than one-half the clock signal frequency, $f_1$. By using an envelope signal frequency spectrum 34 conforming to equations (I) or (II) there is a substantial decrease in detectable EMI emissions about the primary frequency $f_1$ and the various harmonics $f_2$, $f_3$ (e.g., less energy in frequencies within range $f_1 \pm F_{critical}/2$, $f_2 \pm F_{critical}/2$, $f_3 \pm F_{critical}/2$).

Referring again to FIG. 1, the modulated signal 14 exhibiting the frequency spectrum 36 of FIG. 4 is routed from source 16 to destination 18 via conductive signal path(s) 15. Thus, the signal routed over the PC board traces and other radiation emitting signal paths has its energy significantly spread over a wide bandwidth. As a result, a substantial portion of the EMI emissions will be filtered out by conventional receiver devices, (e.g., frequencies outside of the ranges $f_1 \pm 60$ kHz, $f_2 \pm 60$ kHz, $f_3 \pm 60$ kHz are filtered out). Further, unfiltered EMI emissions picked up by conventional receiver devices are at a substantially reduced energy level. Emissions from circuitry within the destination 18 resulting from signals synchronous to the DSB-SC clock signal 14 also exhibit a broadened spectral content. Thus, the potential emission of electromagnetic interference from such destination circuits also is reduced.

Figure 5:
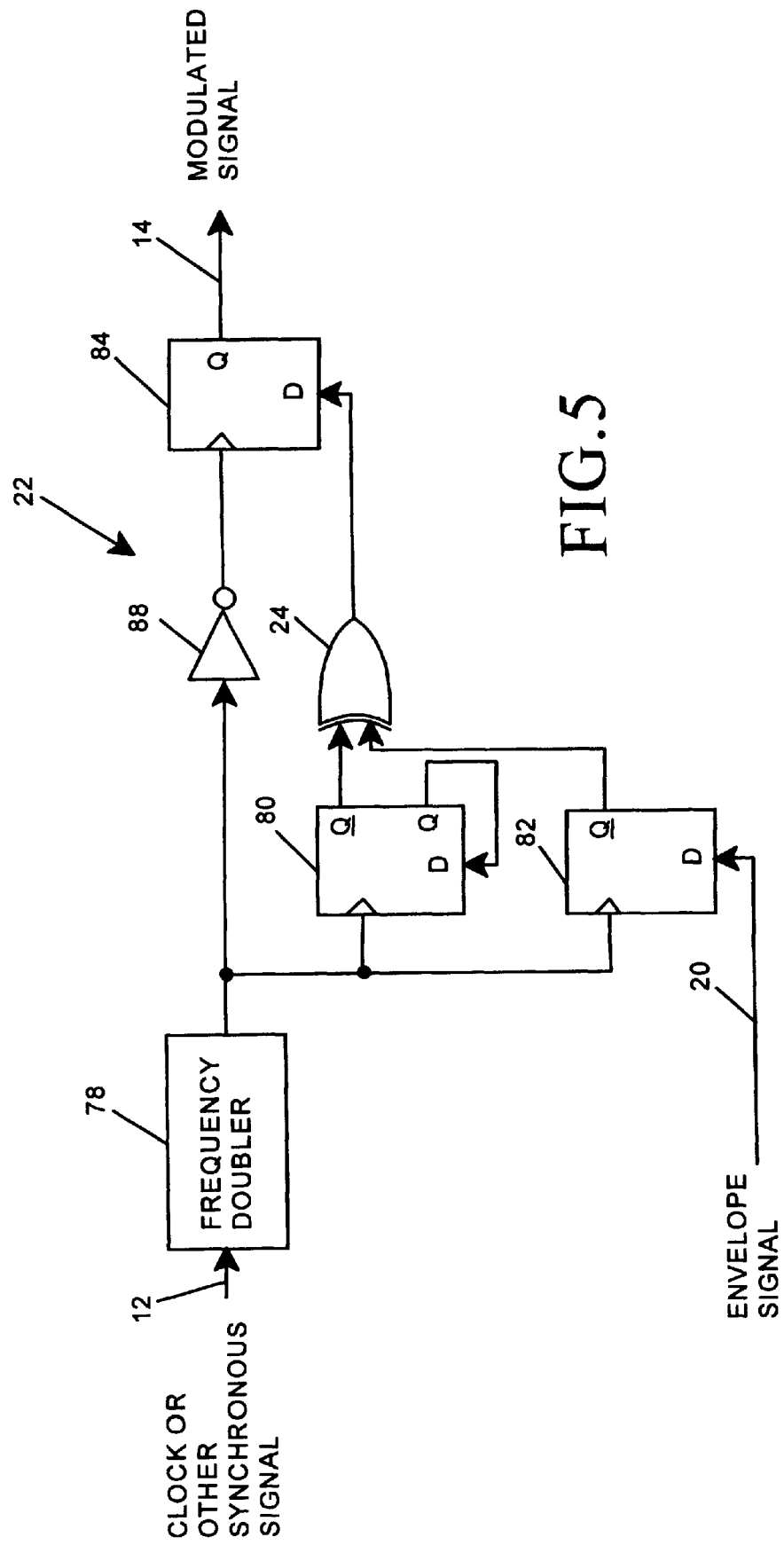
FIG. 5 is a block diagram of an embodiment of a modulation circuit.
Figure 6:
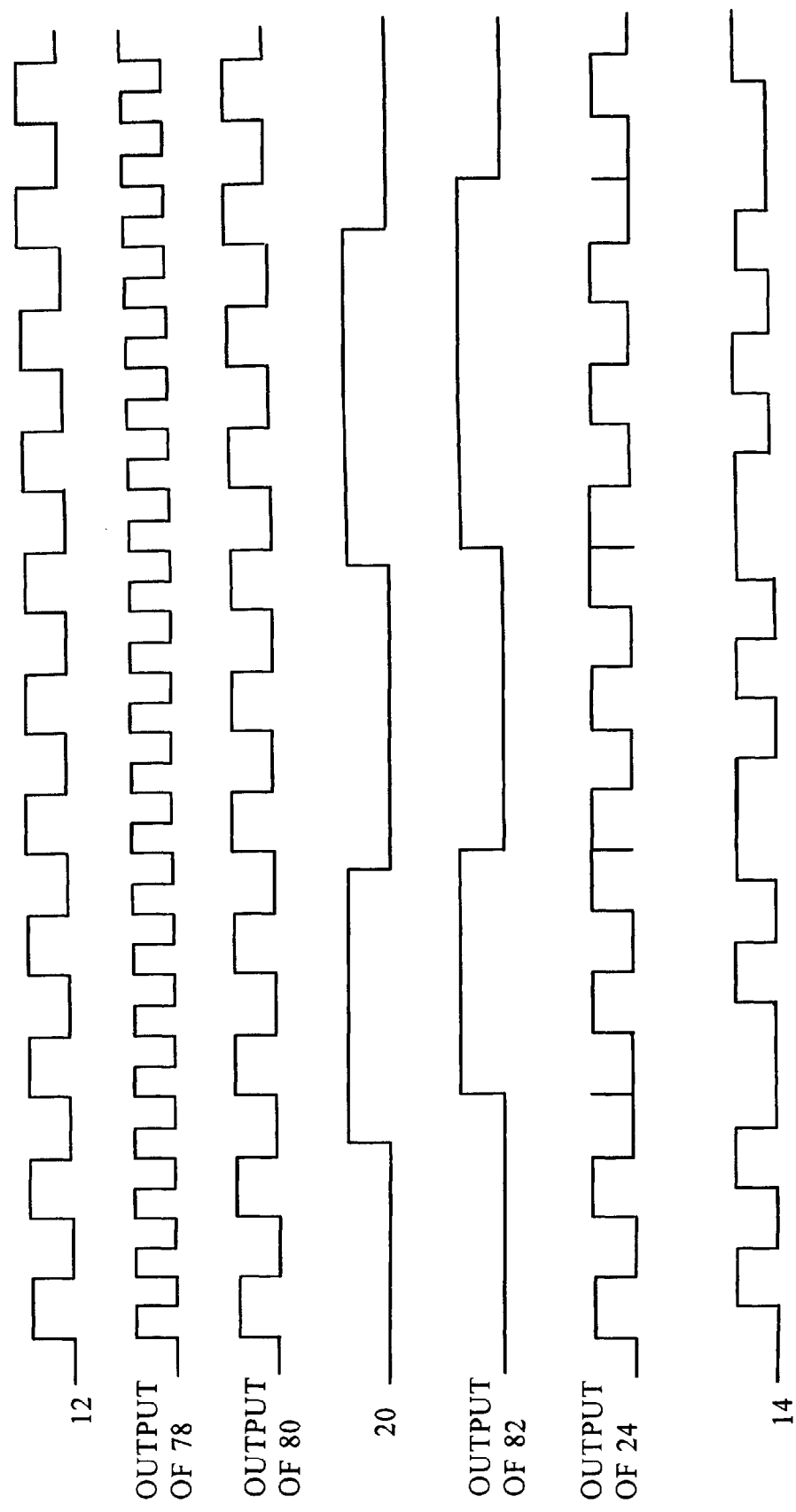
FIG. 6 is a timing diagram for signals shown in FIG. 5.

Referring to FIG. 5 a schematic block diagram of one embodiment of a modulation circuit 22 is shown. FIG. 6 shows a timing diagram of the clock signal 12, envelope signal 20, and the DSB-SC signal 14. The modulation circuit 22 includes a frequency doubler 78, D flip-flops 80, 82, 84, invertor 88 and the exclusive OR gate 24. The frequency doubler 78 doubles the frequency of the clock or other synchronous signal 12 to precisely define each edge of the clock signal or other synchronous signal (see FIG. 6 output signal for doubler 78.) The exclusive OR gate 24 performs the modulation of the clock signal and envelope signal. The flip-flops 80, 82 set the phase relations of signals input to the exclusive OR gate 24 so as to prevent signal glitches from being transmitted from the modulation circuit 22. Specifically, the output of flip-flops 80, 82 could change at the same time causing a glitch at the exclusive OR gate 24 output. Flip-flop 84, however, prevents the glitch from propagating out of the modulation circuit 22 along signal path 14 toward the destination 18. Exemplary output signals at flip-flops 80, 82 and exclusive OR gate 24 are shown in FIG. 6. The output from the modulation circuit 22 is the modulated signal 14. Note in FIG. 6 that the modulated signal 14 exhibits an elongated pulse for each transition of exclusive OR gate 24. Glitches in the output of OR gate 24 are not present in the modulated signal 14 because such glitches do not occur on the falling edge of the frequency doubler 78 output (i.e., when flip-flop 84 latches its data).

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for clocking a digital circuit, comprising the steps of:

generating a synchronous clock signal;

generating an envelope signal;

amplitude modulating the synchronous dock signal and the envelope signal to derive a modulated dual side band suppressed carrier (DSB-SC) clock signal; and clocking the digital circuit with the modulated DSB-SC clock signal.

2. The method of claim 1, in which a set of primary frequencies of the envelope signal exclude frequencies greater than one-half of a frequency of the synchronous clock signal.

3. The method of claim 1, in which the envelope signal exhibits a first bandwidth which exceeds 60 kHz.

4. A digital system, comprising:

a synchronous clock signal;

an envelope signal;

a modulation circuit which amplitude modulates the synchronous clock signal and the envelope signal to generate a modulated dual side band suppressed carrier (DSB-SC) clock signal, said modulated DSB-SC clock signal having an active edge;

a digital circuit which receives and is clocked by the modulated DSB-SC clock signal, wherein the digital circuit sets an output condition in response to an input condition upon receiving the active edge of the DSB-SC clock signal.

5. The system of claim 4, in which a set of primary frequencies of the envelope signal exclude frequencies greater than one-half of a frequency of the synchronous clock signal.

6. The system of claim 4, in which the envelope signal exhibits a first bandwidth which exceeds 60 kHz.

* * * * *

UNITED STATES PATENT AND TRADEMARK OFFICE
CERTIFICATE OF CORRECTION

PATENT NO.    : 5,909,472
DATED         : June 1, 1999
INVENTOR(S)   : Arnett

It is certified that error appears in the above-identified patent and that said Letters Patent is hereby corrected as shown below:

<u>Column 6,</u>
Line 10, delete "dock" and insert therefor -- clock --

Signed and Sealed this

Sixteenth Day of September, 2003

JAMES E. ROGAN
*Director of the United States Patent and Trademark Office*